United States Patent
Kim et al.

(10) Patent No.: US 10,275,607 B2
(45) Date of Patent: *Apr. 30, 2019

(54) LOCATION AND TIME BASED MOBILE APP POLICIES

(71) Applicant: MOBILE IRON, INC., Mountain View, CA (US)

(72) Inventors: Mansu Kim, San Jose, CA (US); Joshua Sirota, Los Altos, CA (US); Suresh Kumar Batchu, Milpitas, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,382

(22) Filed: Jul. 6, 2017

(65) Prior Publication Data

US 2018/0018471 A1 Jan. 18, 2018

Related U.S. Application Data

(63) Continuation of application No. 14/137,758, filed on Dec. 20, 2013, now Pat. No. 9,727,747.

(Continued)

(51) Int. Cl.
*G06F 21/62* (2013.01)
*H04L 29/06* (2006.01)
(Continued)

(52) U.S. Cl.
CPC ............ *G06F 21/62* (2013.01); *G06F 21/604* (2013.01); *H04L 63/102* (2013.01);
(Continued)

(58) Field of Classification Search
CPC ..... H04L 63/20; H04L 63/107; G06F 21/604; G06F 21/62; H04W 4/02
See application file for complete search history.

(56) References Cited

U.S. PATENT DOCUMENTS 7,171,684 B1 * 1/2007 Marquet ............... G06F 21/602
709/217
8,549,656 B2 10/2013 Blaisdell
(Continued)

OTHER PUBLICATIONS

Seetharaman, K. (Oct. 1998). The Cobra Connection. Communications of the ACM CACM. vol. 41 Issue 10, Oct. 1998. (pp. 34-36). (Year: 1998).*

(Continued)

*Primary Examiner* — Robert B Leung
(74) *Attorney, Agent, or Firm* — Van Pelt, Yi & James LLP

(57) ABSTRACT

Location, time, and other contextual mobile application policies are disclosed. Access state information associated with a managed set of applications may be determined based at least in part on environmental context data associated with a mobile device and one or more contextual policies associated with the managed set of applications. The access state information may be provided to at least one application included in the managed set of applications, wherein at least one application in the managed set of applications is configured to use the access state information to regulate use of the application in a manner required by the one or more contextual policies.

22 Claims, 6 Drawing Sheets

Related U.S. Application Data

(60) Provisional application No. 61/745,487, filed on Dec. 21, 2012.

(51) Int. Cl.
  *H04W 4/02* (2018.01)
  *H04W 12/08* (2009.01)
  *G06F 21/60* (2013.01)

(52) U.S. Cl.
  CPC ............ *H04L 63/107* (2013.01); *H04L 63/20* (2013.01); *H04W 4/02* (2013.01); *H04W 12/08* (2013.01)

(56) References Cited

U.S. PATENT DOCUMENTS

| | | | |
|---|---|---|---|
| 8,781,500 B1 | 7/2014 | Dekel | |
| 9,038,158 B1* | 5/2015 | MacKay | H04L 9/0872 |
| | | | 726/10 |
| 9,147,066 B1 | 9/2015 | Tian | |
| 2007/0006321 A1 | 1/2007 | Bantz | |
| 2007/0192864 A1* | 8/2007 | Bryant | G06F 21/54 |
| | | | 726/23 |
| 2009/0300712 A1* | 12/2009 | Kaufmann | G06F 21/10 |
| | | | 726/1 |
| 2009/0320089 A1 | 12/2009 | Lyons | |
| 2009/0322890 A1 | 12/2009 | Bocking | |
| 2010/0169955 A1* | 7/2010 | Happonen | G06F 3/01 |
| | | | 726/4 |
| 2011/0191862 A1* | 8/2011 | Mandava | H04W 12/08 |
| | | | 726/28 |
| 2011/0208797 A1 | 8/2011 | Kim | |
| 2012/0172027 A1 | 7/2012 | Partheesh et al. | |
| 2012/0221627 A1* | 8/2012 | Sainio | H04L 29/08729 |
| | | | 709/203 |
| 2012/0303872 A1 | 11/2012 | Benhase et al. | |
| 2012/0330734 A1 | 12/2012 | Brown et al. | |
| 2013/0091543 A1* | 4/2013 | Wade | G06F 21/54 |
| | | | 726/1 |
| 2013/0298185 A1* | 11/2013 | Koneru | G06F 15/173 |
| | | | 726/1 |
| 2014/0373017 A1* | 12/2014 | Rocquelay | G06F 9/4881 |
| | | | 718/101 |

OTHER PUBLICATIONS

McDaniel, P. D., & Prakash, A. (Apr. 2003). A Flexible Architecture for Security Policy Enforcement. In DISCEX (2) (pp. 234-239). (Year: 2003).*

U.S. Appl. No. 14/137,758, Office Action dated Mar. 6, 2014.

* cited by examiner

LOCATION AND TIME BASED MOBILE APP POLICIES

CROSS REFERENCE TO OTHER APPLICATIONS

This application is a continuation of co-pending U.S. patent application Ser. No. 14/137,758, entitled LOCATION AND TIME BASED MOBILE APP POLICIES, filed Dec. 20, 2013, which claims priority to U.S. Provisional Patent Application No. 61/745,487, entitled LOCATION AND TIME BASED MOBILE APP POLICIES, filed Dec. 21, 2012, both of which are incorporated herein by reference for all purposes.

BACKGROUND OF THE INVENTION

Mobile devices (e.g., smartphone, tablets, etc.) often include different types of applications. For example, a single mobile device may include enterprise applications (e.g., enterprise resource planning (ERP), customer relationship management (CRM), enterprise email, and/or other applications), personal applications (e.g., games, social networking apps, personal email applications, and/or other applications), and/or other types of applications. In some cases, an enterprise administrator may wish to limit use of certain applications (e.g., sets/groups of applications) in certain scenarios.

BRIEF DESCRIPTION OF THE DRAWINGS

Various embodiments of the invention are disclosed in the following detailed description and the accompanying drawings.

DETAILED DESCRIPTION

Figure 1:
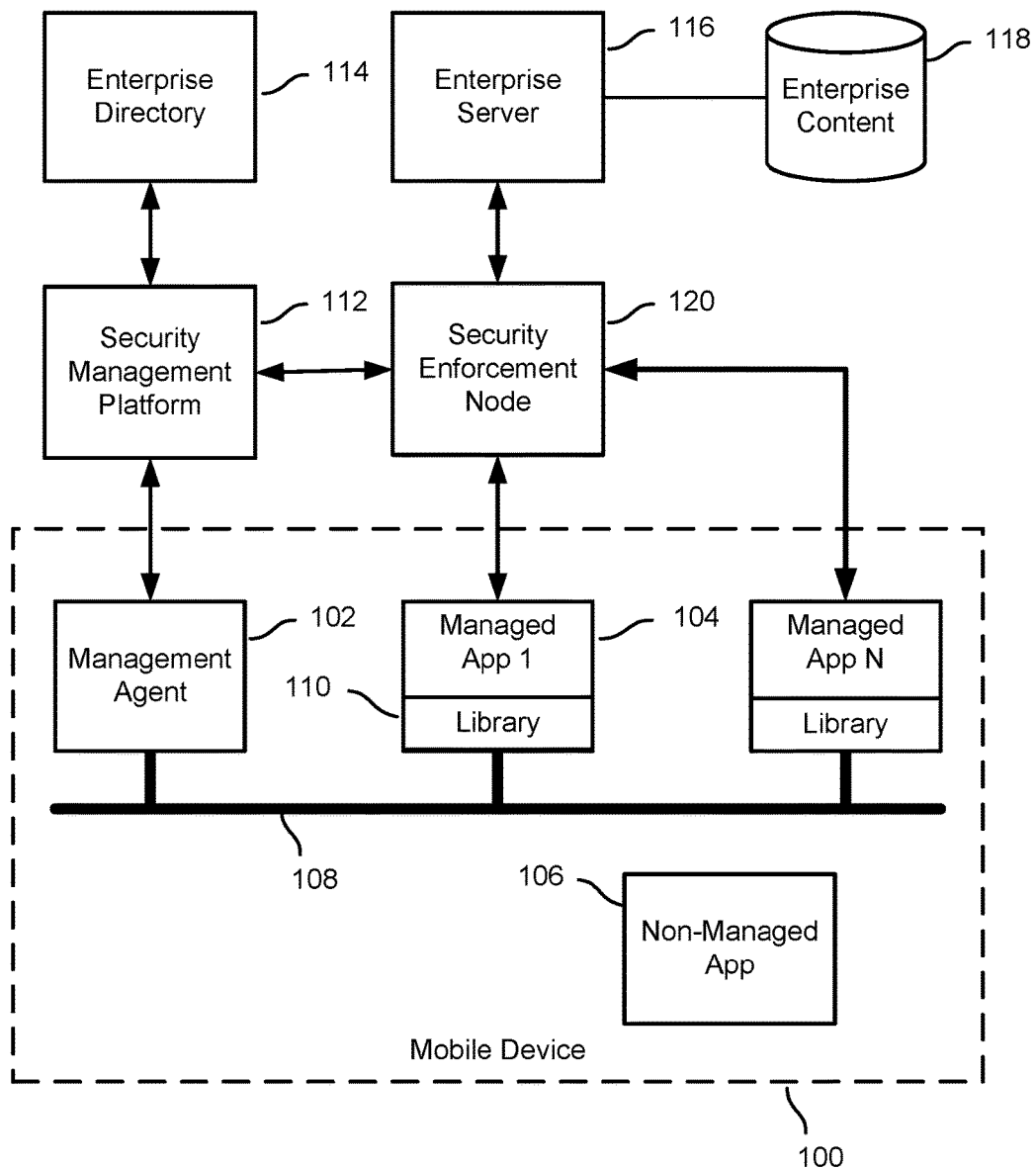
FIG. 1 is a block diagram illustrating embodiments of a system to control access to mobile applications.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Location, time, and other contextual mobile application policies are disclosed. In various embodiments, location, time, connection-based, and/or other contextual policies may be used to determine whether access to application(s) in a managed set of applications (e.g., managed applications) on a mobile device is granted, restricted, and/or blocked. For example, using the techniques disclosed herein, access to mobile application(s) may be controlled based at least in part on a geographic location of a mobile device, a time (e.g., current time, periods of time, etc.), connection status (e.g., Wi-Fi network, cellular network, Bluetooth® connection, near field communication (NFC) connection, etc.), and/or other factors. In some embodiments, access to some mobile apps may be permitted (e.g., granted) while access to other mobile apps on the same device is blocked and/or otherwise restricted.

In various embodiments, access state information associated with a managed set of applications may be determined based at least in part on environmental context data associated with a mobile device and one or more contextual policies associated with the managed set of applications. The access state information is provided to at least one application included in the managed set of applications. At least one application in the managed set of applications is configured to use the access state information to regulate use of the application in a manner required by the one or more contextual policies. The techniques disclosed herein may, for example, be used by an enterprise administrator to control aspects of a user's access to managed mobile application(s) based at least in part on an environmental context (e.g., location, time, connection status, etc.) of the device.

FIG. 1 is a block diagram illustrating embodiments of a system to control access to mobile applications. In the example shown, a mobile device 100 (e.g., smartphone, tablet, etc.) includes a management agent 102 (e.g., a mobile device management (MDM) agent, a trusted management agent, trust client app), managed application(s) 104 (e.g., protected application(s), authorized application(s)), unmanaged application(s) 106 (e.g., non-managed application(s), non-authorized application(s), untrusted application(s), personal application(s)), and/or other applications. In some embodiments, unmanaged applications 106 may include a device user's personal applications (e.g., personal games, personal cloud file sharing applications, social networking applications, personal email applications). The managed applications 104 may include enterprise applications (e.g., applications used for work, applications provided by the enterprise). In some embodiments, a device may include sets of managed applications 104, and each managed set may include (e.g., be managed in) an enterprise zone. Each managed set (e.g., enterprise zone) may be associated with separate contextual policies (e.g., contextual use policies).

In some embodiments, the management agent 102, managed applications 104, and/or other components may be components of an MDM system. The management agent 102, managed applications 104, and/or other components are configured to share information/data in a trusted manner via a secure application connection bus 108 (e.g., secure mobile application connection bus, secure inter-application connection bus, secure application command bus, etc.). For example, access state information (e.g., indicating whether access should be granted to a managed application 104, lists of applications, settings, and/or other information) may be shared in a trusted manner among applications authorized to access the secure application connection bus 108.

In some embodiments, a library 110 (e.g., a library compiled into the application, wrapped into the application) may be associated with a managed application 104. The library 110 may modify an application's code to behave differently than the corresponding unmodified version of the application behaves. For example, the library 110 may mediate communication between a managed application 104 and the management agent 102. For example, the library 110 may retrieve information from the secure application connection bus 108, provide information to the secure application connection bus 108, and/or control access to a managed application 104 using the techniques described herein. The library 110 may reconfigure a managed application 104 to allow the management agent 102 to perform actions on behalf of the managed application 104 including invoking mobile operating system functionality, using mobile device resources, and accessing/storing application data. The library 110 may, in some embodiments, enforce policies, execute actions, regulate use, apply configuration changes, and/or perform other operations within the managed application 104. For example, a library 110 may determine whether access to the managed application 104 should be granted, restricted and/or blocked (e.g., based on access state information retrieved from the management agent) using the techniques discussed herein. In some embodiments, the library 110 may regulate use of the application in a manner required by one or more contextual policies. For example, the library 110 may enforce access restriction policies and/or execute other actions associated with a managed application 104.

According to various embodiments, the management agent 102, managed applications 104, and/or other elements are configured to transfer data in a trusted manner (e.g., securely) via the secure application connection bus 108. In some embodiments, data may be transferred in a trusted manner among applications authorized to have access to the secure application connection bus 108 by storing the data in an encrypted form in a shared data storage location (e.g., a paste board, shared keychain location, and/or other storage). In various embodiments, data may be transferred in a trusted manner from the management agent 102 to the managed application 104 authorized to have access to the secure application connection bus 108 by calling a uniform resource locator (URL) scheme associated with the managed application 104 and including the encrypted data in the URL call. This URL scheme-based technique may also be used to transfer information from a managed application 104 to the management agent 102 and/or between managed applications 104.

In various embodiments, a security management platform 112 (e.g., a virtual smartphone platform, security management server, etc.) manages polic(ies) (e.g., contextual policies), configuration(s), and/or settings associated with the mobile device 100. The security management platform 112 may, for example, determine contextual policies (e.g., location policies, temporal policies, connection-based policies, and/or geotemporal policies) associated with one or more sets of managed applications 104 on the device 100. In various embodiments, the security management platform 112 may determine one or more managed applications to include a set of managed applications 104. In some embodiments, one or more contextual policies associated with a set of managed applications may be determined by the security management platform 112 based at least in part on input from a user (e.g., administrator) of the security management platform 112 and/or information retrieved from an enterprise directory 114. The enterprise directory 114 may be an enterprise data repository (e.g., including user (e.g., employee) information, group information, device information, etc.)

In various embodiments, the security management platform 112 may control aspects of managed application 104 functionality using the management agent 102 as an intermediary. In various embodiments, identities of managed applications (e.g., application identifiers, Bundle identifiers, managed application URL schemes), contextual policies, and/or other information associated with each set of managed applications may be provided (e.g., pushed) to the management agent 102. For example, a mobile device 100 may include multiple sets of managed applications 104 and each managed set of applications may be associated with separate contextual policies. In some cases, each managed set may be associated with a management agent 102; however, in other cases, one management agent 102 may manage access to multiple sets of managed applications. The management agent 102 may pass information (e.g., access state information) to the managed applications 104, implement policies associated with the managed applications 104, and/or perform other operations based on information (e.g., commands) from the security management platform 112. The management agent 102 may implement policies, execute commands, and/or perform other actions related to the managed applications by providing information to the secure application connection bus 108 for retrieval by the library 110 associated with a managed application 104.

According to various embodiments, communications between the mobile device 100 and enterprise backend server(s) 116 (e.g., enterprise servers, file servers, email servers, application servers, etc.), enterprise content 118 (e.g., files, enterprise data), network resources, and/or other components pass through a security enforcement node 120 (e.g., a reverse proxy server, sentry). In various embodiments, the security enforcement node 120 is a reverse proxy for synchronization, data transfer, and/or other traffic between managed applications 104 and enterprise servers such as the backend server 116.

Figure 2:
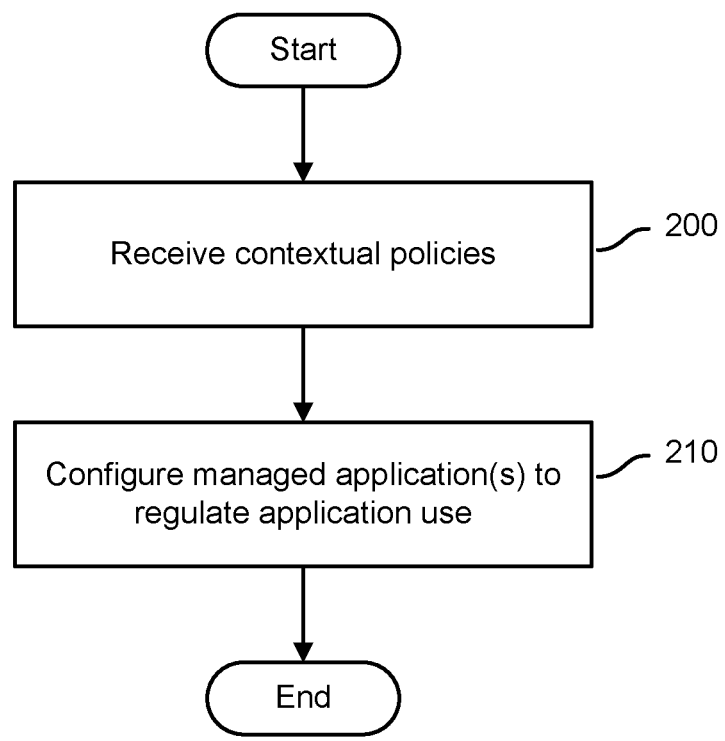
FIG. 2 is a flowchart illustrating embodiments of a process of configuring a managed set of applications.

FIG. 2 is a flowchart illustrating embodiments of a process of configuring a managed set of applications. In various embodiments, the process is performed by the system 100 of FIG. 1. At 200, one or more contextual policies may be received. In various embodiments, the contextual policies may be received at a management agent associated with a managed set of mobile applications (e.g., managed mobile applications). The contextual policies may include, for example, location policies, temporal policies, connection policies, geotemporal policies, and/or other types of policies.

In various embodiments, a location policy may include a geographic location-based (e.g., physical location), virtual location-based, and/or other policy associated with mobile device location. A geographic location-based policy may include a policy that restricts (e.g., limits, denies, disallows, mediates, interferes with) application use based on a geographic location of a device. For example, a geographic location policy may include a bounded geographic area (e.g., zone) defined by a set of geographic coordinates (e.g., global position system (GPS) coordinates, longitude and/or latitude coordinates, universal transverse Mercator (UTM) coordinates, universal polar stereographic (UPS) coordinates, elevation, and/or other coordinates). Multiple geographic coordinates and/or boundary lines between the coordinates may define a geographic boundary (e.g., a polygon) surrounding a geographic area. In various embodiments, a location-based policy may selectively authorize, restrict, and/or deny use of at least one feature of an application based at least in part on a location of a mobile device.

In some embodiments, a temporal policy may include a policy based at least in part on time. A temporal policy may include a policy that restricts (e.g., limits, denies, disallows, interferes with) application use based on a time (e.g., current time, time of day, etc.) associated with a mobile device. For example, a temporal policy may include (e.g., specify, define) a period of time (e.g., 8 AM to 6 PM, work hours, non-work hours, daylight hours, etc.) in which access to mobile application(s) (e.g., in a set of managed mobile applications) may be unrestricted, restricted, and/or denied. In various embodiments, a temporal policy may selectively authorize, restrict, and/or deny use of at least one feature of an application based at least in part on a time (e.g., current time, period of time, etc.) associated with a mobile device.

According to some embodiments, a connection policy may include a policy based at least in part on a connection status (e.g., connection state) of a mobile device. A connection policy may include a policy that restricts (e.g., limits, denies, disallows, interferes with) application use based on a connection status associated with a mobile device. A connection may include a cellular connection (e.g., a cellular network to which the mobile device is connected, cellular tower(s) with which the mobile device communicates, and/or other cellular connection attributes), a Wi-Fi connection (e.g., a Wi-Fi network to which the mobile device is connected/communicating), a Bluetooth® connection (e.g., devices, components, and/or other Bluetooth®-configured hardware to which a mobile device is connected/communicating), a Bluetooth® Low Energy (Bluetooth® LE) connection, a near field communication (NFC) connection, and/or any other type of connection. In various embodiments, a connection-based policy may selectively authorize, restrict and/or deny use of at least one feature of an application based at least in part on a connection status associated with a mobile device.

In various embodiments, a contextual policy may include a geotemporal policy. A geotemporal policy may include a policy combining geographic location, time, connection status, and/or other parameters. For example, a geotemporal policy may restrict (e.g., limit, deny, disallow, mediate, interferes with) application use based on a combination of location (e.g., when device is outside of a region (e.g., an enterprise building)), temporal parameters (e.g., between 6 PM and 5 AM), connection parameters (e.g., not connected to an enterprise Wi-Fi network), and/or other parameters. In this example, multiple parameters may be combined into one geotemporal policy associated with a set of applications. In some embodiments, however, one or more separate location, temporal, connection, and/or other policies may be associated with a managed set of applications.

In various embodiments, contextual policies may be determined at a security management platform, a management agent, and/or other location. Contextual policies may be associated with managed set(s) of applications on a mobile device (e.g., set(s) of managed applications), one or more individual applications, a mobile device, and/or other elements. In some embodiments, contextual policies associated with a set of applications, application, and/or device may be determined at the security management platform by processing user information (e.g., user identity, credentials, permission, etc.), group information (e.g., a device group, an employee group associated with the user, etc.), and/or other information as discussed below.

At 210, one or more managed applications may be configured to regulate an application use. In some embodiments, at least on managed application in a managed set of applications may be configured to regulate use of the managed application in a manner required by one or more contextual policies. In various embodiments, at least one managed application may be modified to include a library (e.g., a dynamic link library (DLL) and/or other library). For example, a library may be compiled into the managed application, wrapped into the application, included in a software development kit (SDK), and/or otherwise associated with a managed application. In various embodiments, a library may be added to a managed application during development (e.g., coding) of the application by the application developer, by modifying the application code after development, in a subsequent wrapping operation, and/or using other approaches.

In some embodiments, a library may be configured to communicate with a management agent via a secure application connection bus. For example, data (e.g., access state information) may be transferred in a trusted manner from the management agent to a managed application by storing the data in an encrypted form in a shared data storage location (e.g., a paste board, shared keychain location, and/or other storage). In various embodiments, data may be transferred in a trusted manner from the management agent to the managed application authorized to have access to the secure application connection bus by calling a uniform resource locator (URL) scheme associated with the managed application and including the encrypted data in the URL call. This URL scheme-based technique may also be used to transfer information from a managed application to the management agent and/or between managed applications. In various embodiments, the library may be configured to mediate the secure transfer of information to the managed application.

In some embodiments, the library may be configured regulate use of the application in a manner required by one or more contextual policies. In some embodiments, the library may be configured to retrieve, process (e.g., parse), and/or execute access control commands from the management agent. For example, a library may enforce access restriction policies, grant and/or deny access to the managed application, and/or execute other actions associated with a managed application based on access state information received from a management agent. In some embodiments, using a library, a managed application may be configured to regulate its own use in a manner consistent with (e.g., required by, compliant with) one or more contextual policies.

Figure 3:
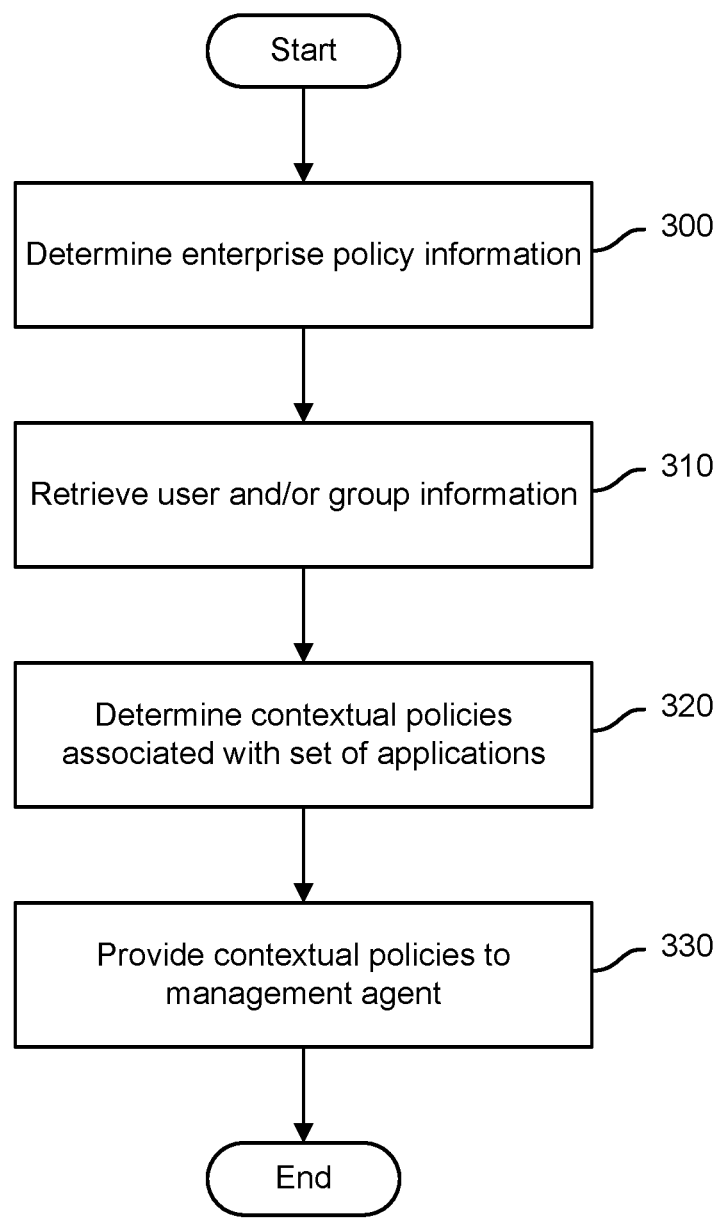
FIG. 3 is a flowchart illustrating embodiments of a process of determining contextual policies associated with managed sets of applications.

FIG. 3 is a flowchart illustrating embodiments of a process of determining contextual policies associated with managed sets of applications. In various embodiments, the process is performed by the system 100 of FIG. 1. At 300, enterprise policy information may be received. In some embodiments, the enterprise policies may be received (e.g., configured) at the security management platform. In some embodiments, enterprise policy information may be received from a user (e.g., an enterprise information technology (IT) administrator) at a security management platform. In some embodiments, enterprise policies may include contextual policies (e.g., location policies, temporal policies, connection policies, geotemporal policies, etc.) associated with one or more mobile devices, users, and/or sets of applications.

By way of example, one set of contextual policies (e.g., defined by a hospital administrator) may allow access to a managed set of applications (e.g., associated with the hospital) when a mobile device is in the hospital (e.g., as defined by a geographical location parameters), connected to a hospital Wi-Fi network (e.g., a particular Wi-Fi SSID), and/or on a specific cellular network. In this example, the following sets of contextual policy information may be configured at the security management platform.

{app=ERP,allowLocation={wifi=[{ssid=hospital,
    bssid=001c.0ed1.ac80}],
cellular=[{mnc=123,mcc=123}],latlong=[{lat=1.1,
    long=2.2,radius=2}]},
disallowLocation=={wifi=[{ssid=hospital,
    bssid=001c.0ed1.ac80}],
cellular=[{mnc=123,mcc=123}],latlong=[{lat=1.1,
    long=2.2,radius=2}]}}

At 310, user and/or group information may be retrieved. According to some embodiments, a security management platform may retrieve user information, group information, and/or other information from an enterprise directory. User information may include, for example, mobile device user identit(ies), credentials, permissions, and/or other information. Group information may include, for example, mobile device group(s), employee group(s) (e.g., management, engineering department, office locations, etc.) associated with a user, and/or other information.

At 320, contextual policies associated with a set of applications may be determined. In some embodiments, contextual policies associated with a managed set of applications, an application, and/or device may be determined at the security management platform by processing user information (e.g., user identity, credentials, permission, user's work schedule, user's work location, etc.), group information (e.g., a device group, an employee group associated with the user, etc.), and/or other information.

By way of example, based on an identity of a user, the user's work schedule, the user's work location, and/or other information; one or more contextual policies may be determined for a managed set of applications (e.g., enterprise applications). For example, the contextual policies may dictate that the user (e.g., a hospital employee) may only be granted access to enterprise applications (e.g., a managed set of applications) while the user is at his/her work location (e.g., at a hospital as defined by geographical location, cellular network, hospital Wi-Fi network, etc.) during his/her shift hours. Access to the set of enterprise applications may be restricted and/or denied when the user is not at the hospital and/or when the current time does not match the time period of the user's work shift. This is one example, and many different types/combinations of contextual policies may of course be defined.

At 330, contextual policies may be provided to a management agent. In some embodiments, a security management platform may securely provide (e.g., push, transfer) contextual policies to a management agent. For example, the contextual policies may be encrypted (e.g., represented in hash(es) or other secured form) and provided to the management agent.

In one example, contextual policies (e.g., determined by security management platform) may allow access to a set of applications when the mobile device is in a hospital (e.g., as defined by a geographical location parameters), connected to a hospital Wi-Fi network, and on a specific cellular network. The contextual policies may be encrypted (e.g., represented as a hash or other values) at a security management platform and then provided to the management agent. In this case, the security management platform may provide and/or the management agent may receive the following example contextual policy information:

{app=ERP,allowLocation={wifi=[{ssidhash=abcd123,b
    ssidhash=cdef1234}],
cellularhash=[{mncmcc=fda123}],latlong=[{lat=1.1,
    long=2.2,radius=2}]}}

Figure 4:
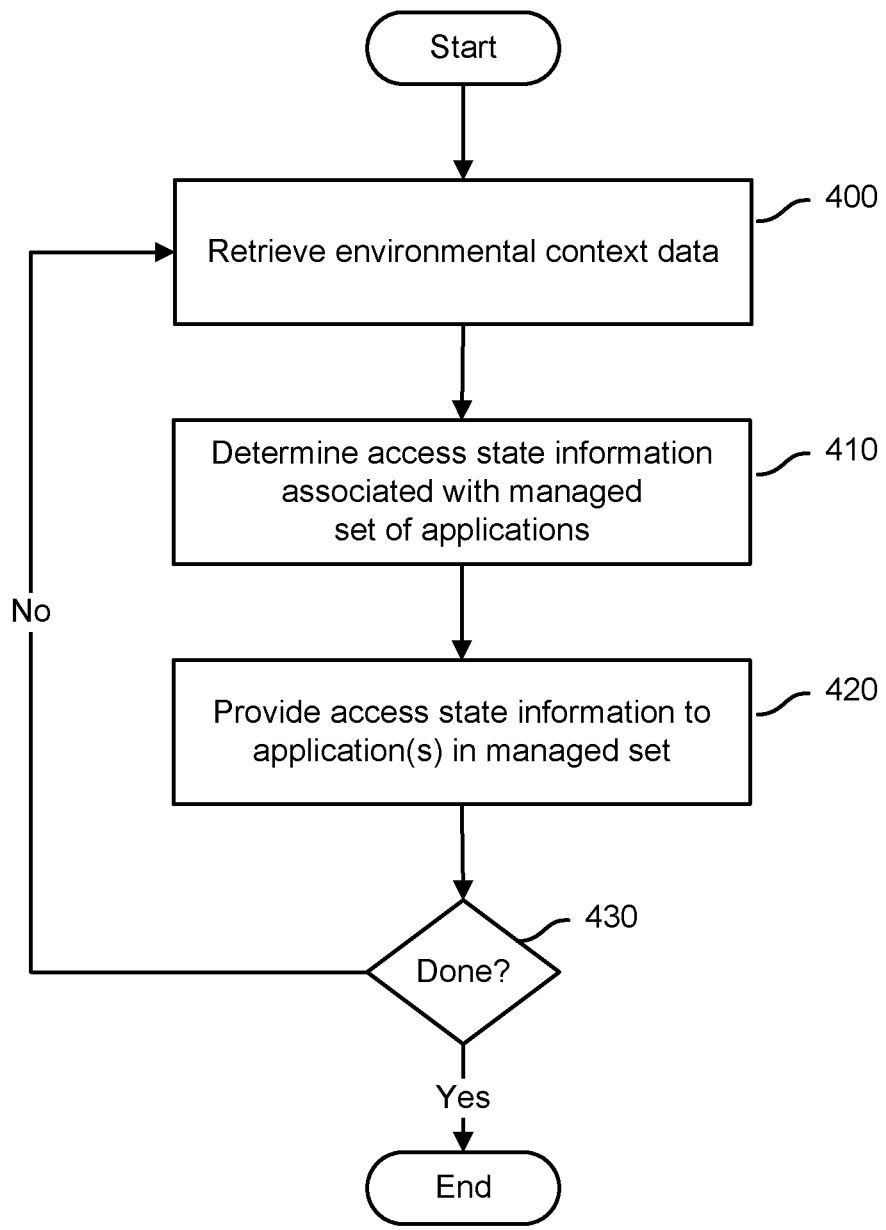
FIG. 4 is a flowchart illustrating embodiments of a process of controlling access to a managed set of applications.

FIG. 4 is a flowchart illustrating embodiments of a process of controlling access to a managed set of applications. In various embodiments, the process is performed by the system 100 of FIG. 1. At 400, environmental context data may be retrieved. In some embodiments, a management agent may retrieve environmental context data from a mobile device operating system, an application, mobile device hardware, and/or other locations. Environmental context data may include, for example, location data, temporal data, connection data, and/or other types of data associated with the mobile device. For example, location data may include a geographic location of the mobile device (e.g., geographic positions, GPS position, and/or other location). The temporal data may, for example, include a current time (e.g., registered in a clock associated with the device, provided by an application, retrieved from a server, etc.) associated with the device. The connection data may, for example, include a connection state (e.g., what cellular network the device is on, the cellular towers with which the device is communicating, a Wi-Fi network to which the mobile device is connected, etc.) of the mobile device. In some embodiments, the environmental context data may include other data/information associated with the mobile device.

In various embodiments, the management agent may query the mobile device operating system to retrieve environmental context data. For example, a mobile device operating system may be queried to determine a current location of the device (e.g., geographic location, etc.), a current time, a connection status (e.g., Wi-Fi network(s) to which the device is connected), and/or other environmental context data. In some embodiments, an operating system may provide (e.g., push) a current location of the device, a current time, a connection status, and/or other environmental context data to the management agent.

In some embodiments, an application associated with the device (e.g., installed on the device) may be used to determine environmental context data including, for example, a location (e.g., geographic location, etc.), a current time, a connection status (e.g., Wi-Fi network(s) to which the device is connected), and/or other environmental context data. For example, an application may be included on the device to monitor environmental contextual data associated with the device and provide the environmental contextual data to the management agent. In various embodiments, the application may be associated with the managed set of managed applications (e.g., a set of applications managed by the management agent). In some embodiments, the application may transfer information to the management agent via a secure application connection bus (e.g., shared storage location, pasteboard, URL scheme-based secure data transfer mechanism). In various embodiments, however, the application may not be associated with the secure application connection bus and/or managed set of applications.

In various embodiments, the management agent may retrieve environmental context data (e.g., from the OS, an application, hardware, etc.) periodically (e.g., at intervals), based on trigger(s), and/or using other approaches. For example, the management agent may be configured to retrieve environmental context data periodically (e.g., every minute, every thirty seconds, etc.). In another example, the management agent may be configured to retrieve environmental context data based at least in part one or more triggering events. For example, the management agent may retrieve environmental context information when an application (e.g., a managed application) is opened and/or closed, when a state of the device changes (e.g., the device goes to standby, goes to lock mode, is unlocked, restarted, etc.), and/or when other events occur. In some embodiments, an operating system associated with the mobile device may provide the management agent a notification upon a location change (e.g., a major location change) as defined by geographic location (e.g., GPS coordinates), connection state (e.g., cellular network/tower changes), and/or other parameters.

At 410, access state information associated with a managed set of applications may be determined. In some embodiments, access state information associated with the managed set of applications may be determined based at least in part on environmental context data associated with the mobile device and one or more contextual policies associated with the managed set of applications. Access state information may, for example, include information designating whether access to a managed set of applications should be granted (e.g., allowed), restricted, and/or blocked. The access state information may also include a list of allowed/restricted applications, contextual policy information, and/or other information. In various embodiments, the access state information may be used by a managed application (e.g., a library associated with a managed application) to regulate use of the application in a manner required by one or more contextual policies.

In various embodiments, it may be determined whether the environmental context data satisfies one or more contextual policies. In some embodiments, environmental context data (e.g., location data, temporal data, connection data) retrieved by the management agent may be compared one or more contextual policies associated with the managed set of applications (e.g., managed applications) to determine access state information.

In the event the environmental context data associated with the mobile device satisfies (e.g., is in line with, corresponds to, does not violate) the one or more contextual policies associated with a set of applications, an access state associated with the set of applications may be determined to be (e.g., set to, defined as) allowed, granted, and/or unrestricted. For example, an access state associated with a set of applications may be set to allow access. The access state information may include, for example, an access allowance command (e.g., parameter, indicator). The access allowance command may include instructions commanding an application library to allow access to a managed set of applications as discussed below.

By way of example, contextual use policies associated with a set of applications may allow access to a managed set of applications when the mobile device is in a hospital (e.g., as defined by a geographical location parameters), connected to a hospital Wi-Fi network, and on a specific cellular network. Contextual data may be retrieved (e.g., from the OS, an application, hardware, etc.) that indicates the mobile device is connected to a hospital Wi-Fi (e.g., a Wi-Fi service set identifier (SSID) associated with the hospital—a basic service set identifier (BSSID) 001c.0ed1.ac80) and is located within the geographical area associated with the hospital. In this case, it may be determined that the environmental context data satisfies the one or more contextual policies associated with a set of applications. Based at least in part on this determination, the access state information may be set to granted (e.g., allowed, unrestricted).

In various embodiments, upon a determination that the environmental context data does not satisfy (e.g., violates) at least one of the contextual policies associated with a managed set of applications, access state information associated with the set of applications may be generated to restrict (e.g., limit) access to the application. In this case, the access state information may include a restrict access command. In some embodiments, a type of restriction (e.g., partial access, access with limited settings) may be determined based at least in part on which contextual policies are violated. A restrict access command may include instructions commanding an application library to restrict access to at least one feature of a managed application. For example, the library associated with an application may restrict features, functions, settings of a managed application.

By way of example, in the event that environmental context data violates a temporal contextual policy while satisfying one or more location-based policies, partial access to a set of applications may be granted. For example, a mobile device user may be at work after hours and a temporal contextual policy (e.g., only allow access during work hours) may be violated while a location-based policy is satisfied (e.g., not violated). In this case, the user may be, for example, able to access a set of enterprise applications but may not be allowed access to enterprise network resources (e.g., enterprise file storage, email server, etc.) from within the application. Other managed application restrictions may of course be deployed.

According to various embodiments, upon a determination that environmental context data associated with a mobile device does not satisfy (e.g., violates) at least one of the contextual policies associated with a managed set of applications, access state information associated with the managed set of applications may be generated to block (e.g., deny) access to the application. In this case, the access state information may include a block access command. A block access command may include instructions commanding an application library to block (e.g., deny) access to the managed application. Based at least in part on the block access command, a library associated with the application may not allow a user to open the managed application. In this case, the user may be directed to the management agent for further instructions.

At 420, the access state information may be provided to at least one application included in a managed set of applications. In various embodiments, at least one application in the managed set of applications may be configured to use the access state information to regulate use of the application in a manner required by the one or more contextual policies. For example, a library associated with a managed application may be configured to enforce policy restrictions within the application based at least in part on commands (e.g., information, parameters) included in the access state information.

In some embodiments, the access state information may be provided to one or more applications in a set of applications in a trusted manner using a secure application connection bus. In various embodiments, the access state information may be encrypted (e.g., by the management agent) and stored in encrypted form in a shared storage location (e.g., a pasteboard, a secure keychain storage location, and/or other storage location). At least one application in the set of applications associated with the access state information (e.g., the application to which the state information is applicable) may be configured (e.g., authorized) to retrieve (e.g., retrieve and/or decrypt) the access state information from the shared storage location.

In some embodiments, the access state information may be encrypted (e.g., by the management agent) and provided to at least one application in a set of applications using one or more URL scheme calls. For example, encrypted access state information may be included in a URL scheme call to ABC application (e.g., "ABC://access state information"). The access state information included in the URL call may be decrypted by the application (e.g., a library associated with the application).

By way of example, environmental context data (e.g., indicating that the mobile device is connected to a Wi-Fi service set identifier (SSID) associated with the hospital—a basic service set identifier (BSSID) 001c.0ed1.ac80) may be determined to satisfy contextual policies (e.g., requiring the device to be connected a Wi-Fi network with basic service set identifier (BSSID) 001c.0ed1.ac80) associated with a managed set of applications. Based at least in part on this determination, access state information associated with the set of applications may be generated to include an authorized, allowed, and/or granted command. In this case, the management agent may provide the following example access state information (e.g., including contextual policy information) to a secure application connection bus associated with the set of applications:

{Zone={authenticationExpire=1343071545,AuthorizedApps=[{appid=company.files.Se,locationPolicy=1},{appid=company.browser.Be,locationPolicy=2},{appid=company.SFA.Ae,locationPolicy2}, {appid=company.viewer.De,location policy=3},
appid=company.ERP.Ee, LocationPolicy=1], zoneLock=false},
LocationPolicy={1={wifi=[{ssidhash=abcd123, bssidhash=cdef1234}]}}}

At 430, it may be determined whether the process is complete. According to some embodiments, one or more of steps 400-420, or any combination thereof, may be performed iteratively, recursively, and/or repeatedly. For example, environmental context data associated with a mobile device may be updated continuously as time progresses, the device is moved from location to location, the device connects to various networks, and/or upon occurrence of other events. As these events occur, individual steps may be repeated and/or combinations of steps may be performed iteratively, recursively, and/or repeatedly.

Figure 4A:
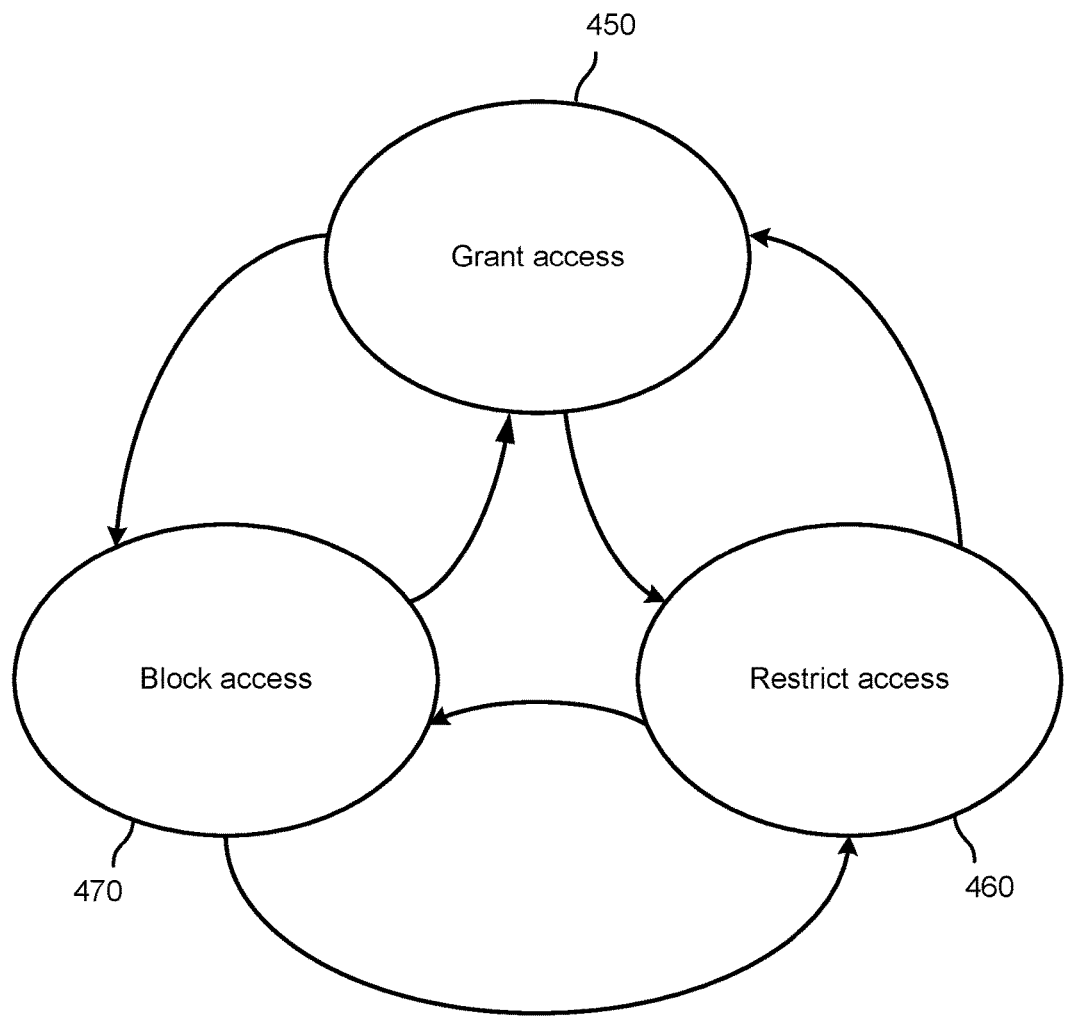
FIG. 4A is a state diagram illustrating an embodiment of a process of controlling access to a managed set of applications.

FIG. 4A is a state diagram illustrating an embodiment of a process of controlling access to a managed set of applications. In some embodiments, access state information may vary (e.g., be determined) based on continuously updated environmental context data and/or contextual policies. In the example shown, in a first state 450 the access state information may be set (e.g., by a management agent) to grant (e.g., allow) access. In the first state 450, the environmental context data (e.g., location, temporal, connection status, etc.) may satisfy one or more contextual policies associated with the set of managed applications. For example, contextual policies associated with the managed set of applications may allow access when the following requirements are satisfied: the mobile is located in a specific office, use of the device occurs during business hours, and the device is connected to an office Wi-Fi network. In the first state 450, the mobile device may be located within office, the current time may be within business hours, and the device may be connected to an enterprise Wi-Fi network. These environmental context data may satisfy the contextual policies associated with the set of managed applications and the access state information may be set to allow access. This access state information may be provided to at least one managed application.

Upon occurrence of an environmental context change event, the access state of the device may transition to a second state 460, in which access is restricted. For example, environmental context data may indicate that the device is in the office, connected to the office Wi-Fi network, but the current time is no longer within business hours. The environmental context data may therefore violate of one of the contextual policies, and the access state information may be set to a second state 460—restricted access (e.g., limited access).

In one example, environmental context data may indicate that the device is no longer in the office. In this case, the access state may transition to a third state 470 and the access state information may be set to block (e.g., deny) access.

In various embodiments, the access state of the managed set of applications may transition between the first state 450 (e.g., a grant access state), a second state 460 (e.g., restrict access state), a third state 470 (e.g., a block access state), and/or other states as the device and/or managed applications are used. In various embodiments, updated access state information may be provided to the managed set of applications upon the occurrence of a transition from one access state to another, periodically, and/or at other times. Applications in the managed set of applications may be configured to retrieve the access state information and regulate use of the application as prescribed in the access state information.

Figure 5:
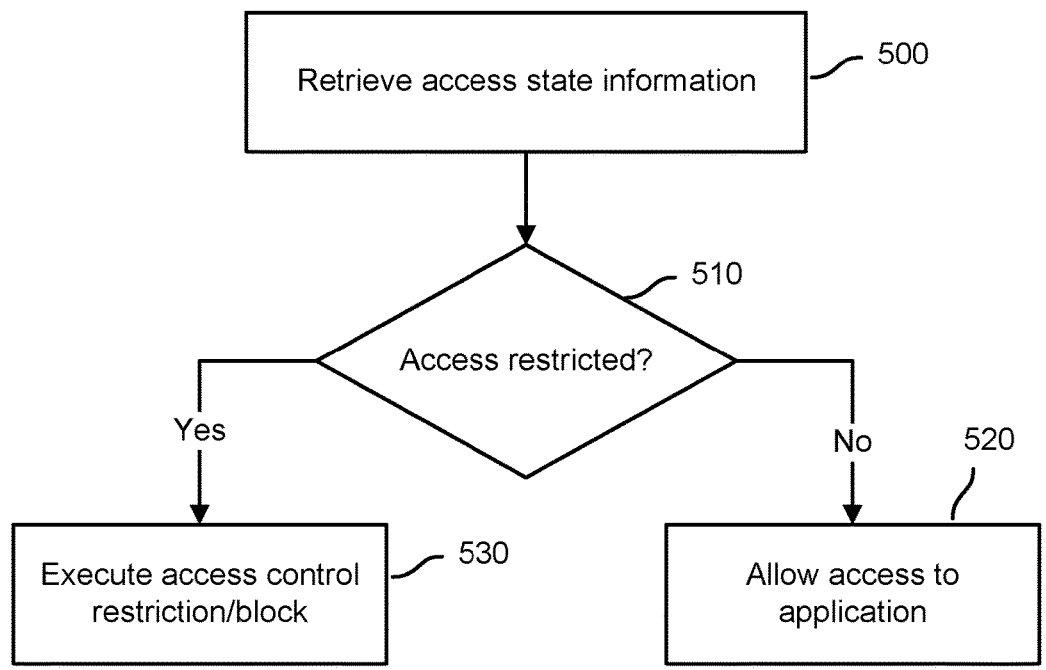
FIG. 5 is a flowchart illustrating embodiments of a process of managing access to an application.

FIG. 5 is a flowchart illustrating embodiments of a process of managing access to an application. In various embodiments, the process is performed by the system 100 of FIG. 1. At 500, access state information (e.g., associated with a set of applications) may be retrieved. In various embodiments, an application library may be configured to retrieve the encrypted access state information from a secure application connection bus, and the library may use a previously-shared key to decrypt the access state information. In various embodiments, an application library may receive the key to be used to decrypt protected content via a mechanism other than the secure application connection bus.

At 510, it may be determined whether access to the application is restricted and/or blocked. In some embodiments, the access state information may include commands indicating that use of a set of applications is restricted and/or blocked (e.g., for a specific user). For example, the access state information may include commands requiring a library associated with the application to restrict and/or block access to the application. In this case, the process may proceed to step 530.

In some embodiments, the access state information may include parameters indicating that use of a set of applications is granted (e.g., unrestricted, allowed, and/or validated). The access state information may include commands requiring a library associated with the application to allow access to the application. In some embodiments, the access state information may include no commands. In this case, the process may proceed to 520.

At 520, access may be granted to the application. In some embodiments, based at least in part on the access state associated with the set of application of which the application is a member, a user may have access (e.g., full access) to the application. In various embodiments, the access state may be changed to locked, denied, and/or restricted based on subsequent events (e.g., device location change, time, network change, etc.).

At 530, access control restrictions/blocks may be executed. In various embodiments, at least one access control restriction may be executed within the application. For example, the retrieved access state information may indicate that access to the application should be denied (e.g., blocked), and a library associated with the application may regulate use of the application to deny access to the application (e.g., lock the application). Upon attempted use, a user may be forwarded to the management agent (e.g., outputting instructions on how to unlock the application).

In some embodiments, credential verification may be required. In some embodiments, access state information may include instructions to execute a credential validation operation. For example, the access state information may include a block access command, and the library associated with the application may direct a user to the management agent for credential validation (e.g., password entry, username entry, etc.).

In some embodiments, the retrieved access state information may indicate that a portion of (e.g., part of) the application functionality should be restricted. For example, the library may execute commands allowing a user to open the application with certain features disabled. In one case, features which access interact with network resources (e.g., enterprise file repositories, email servers, etc.) may be disabled, locked, and/or restricted. The access state information may include instructions/parameters defining which features of an application should be disabled. In various embodiments, a library associated with an application may, based at least in part on the access state information, restrict other applications, components, and/or the operating system from accessing the application. For example, other applications may be restricted from invoking the restricted application, retrieving data from the restricted application, and/or performing other actions associated with the restricted application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining, at a management agent on a mobile device, access state information associated with a managed set comprising two or more applications based at least in part on environmental context data associated with the mobile device and one or more contextual policies associated with the managed set of applications, the contextual policies determined at a security management platform to be associated with the managed set of applications, wherein the one or more contextual policies at least include a temporal contextual policy and a location-based policy; and
   providing the access state information from the management agent to a library associated with a managed application included in the managed set of applications, wherein the library associated with the managed application is configured to use the access state information to regulate use of the application in a manner required by the one or more contextual policies, wherein the library is configured to provide partial access to the managed application in response to the access state information indicates that the environmental context data violates the temporal contextual policy while satisfying the location-based policy.

2. The method of claim 1, further comprising:
   receiving, at the management agent, the one or more contextual policies associated with the managed set of applications.

3. The method of claim 1, wherein the one or more contextual policies are determined based at least in part on mobile device user information in an enterprise directory.

4. The method of claim 1, wherein the one or more contextual policies comprise one or more of at least one temporal policy, at least one location policy, and at least one connection policy.

5. The method of claim 1, further comprising retrieving, by the management agent, the environmental context data associated with the mobile device.

6. The method of claim 5, wherein the environmental context data is retrieved from one or more of an operating system and an application associated with the mobile device.

7. The method of claim 1, further comprising:
   retrieving, by the library associated with the managed application, the access state information associated with the managed set of applications; and
   executing at least one access control restriction associated with the managed application based at least in part on the retrieved access state information.

8. The method of claim 7, wherein retrieving the access state information comprises retrieving, by the library associated with the managed application, the access state information from a secure application connection bus, and wherein executing the at least one access control restriction includes executing, by the library, the at least one access control restriction associated with the managed application.

9. The method of claim 7, further comprising providing an output including an indication that access is restricted.

10. The method of claim 1, wherein determining the access state information associated with the managed set of applications includes:
    determining that the environmental context data does not satisfy at least one of the contextual policies associated with the managed set of applications; and
    generating the access state information including an access control restriction based at least in part on the determination.

11. The method of claim 10, wherein the access control restriction includes one or more of a command to block access to the managed set of applications and a command to restrict access to the managed set of applications.

12. The method of claim 10, further comprising:
    determining that updated environmental context data satisfies at least one of the contextual policies; and generating the access state information including a command to allow access to the managed set of applications.

13. The method of claim 1, wherein determining the access state information associated with the managed set of applications includes:
   determining that the environmental context data satisfies at least one of the contextual policies associated with the managed set of applications; and
   generating the access state information including a command to allow access to the managed set of applications.

14. The method of claim 1, wherein the management agent and the managed set of the two or more applications communicate over a secure connection.

15. The method of claim 14, wherein the secure connection is a connection to which a non-managed application does not have access.

16. The method of claim 1, wherein the library associated with the managed application to which the access state information is provided obtains the access state information and determines, based at least in part on the access state information, whether to perform one of allow access to the managed application, block access to the managed application, and restrict access to the managed application.

17. A system, comprising:
   a processor; and
   a memory coupled with the processor, wherein the memory is configured to provide the processor with instructions which when executed cause the processor to:
      determine, at a management agent on a mobile device, access state information associated with a managed set comprising two or more applications based at least in part on environmental context data associated with the mobile device and one or more contextual policies associated with the managed set of applications, the contextual policies determined at a security management platform to be associated with the managed set of applications, wherein the one or more contextual policies at least include a temporal contextual policy and a location-based policy; and
      provide the access state information from the management agent to a library associated with a managed application included in the managed set of applications, wherein the library associated with the managed application is configured to use the access state information to regulate use of the application in a manner required by the one or more contextual policies, wherein the library is configured to provide partial access to the managed application in response to the access state information indicates that the environmental context data violates the temporal contextual policy while satisfying the location-based policy.

18. The system of claim 17, wherein the memory is further configured to provide the processor with instructions which when executed cause the processor to:
   retrieve, by the library associated with the managed application, the access state information associated with the managed set of applications; and
   execute at least one access control restriction associated with the managed application based at least in part on the retrieved access state information.

19. The system of claim 17, wherein the memory is further configured to provide the processor with instructions which when executed cause the processor to:
   determine that the environmental context data does not satisfy at least one of the contextual policies associated with the managed set of applications; and
   generate the access state information including an access control restriction based at least in part on the determination.

20. A computer program product, the computer program product being embodied in a tangible non-transitory computer readable storage medium and comprising computer instructions for:
   determining, at a management agent on a mobile device, access state information associated with a managed set comprising two or more applications based at least in part on environmental context data associated with the mobile device and one or more contextual policies associated with the managed set of applications, the contextual policies determined at a security management platform to be associated with the managed set of applications, wherein the one or more contextual policies at least include a temporal contextual policy and a location-based policy; and
   providing the access state information from the management agent to a library associated with a managed application included in the managed set of applications, wherein the library associated with the managed application is configured to use the access state information to regulate use of the application in a manner required by the one or more contextual policies, wherein the library is configured to provide partial access to the managed application in response to the access state information indicates that the environmental context data violates the temporal contextual policy while satisfying the location-based policy.

21. The method of claim 14 wherein the secure connection comprises a secure application connection bus.

22. The method of claim 21 wherein each of the applications included in the managed set is authorized to communicate using the secure application connection bus, and wherein an unmanaged application that is not included in the managed set is not authorized to communicate using the secure application connection bus.

* * * * *

UNITED STATES PATENT AND TRADEMARK OFFICE
CERTIFICATE OF CORRECTION

PATENT NO. : 10,275,607 B2
APPLICATION NO. : 15/643382
DATED : April 30, 2019
INVENTOR(S) : Mansu Kim et al.

It is certified that error appears in the above-identified patent and that said Letters Patent is hereby corrected as shown below:

In Column 11, Line 25, delete ""ABC://access state information"" and insert --"ABC://access_state _information"--, therefor.

Signed and Sealed this
Tenth Day of December, 2019

Andrei Iancu
*Director of the United States Patent and Trademark Office*